United States Patent
Dopico et al.

(10) Patent No.: US 6,399,719 B1
(45) Date of Patent: Jun. 4, 2002

(54) CYCLIC UREA-FORMALDEHYDE PREPOLYMER-MODIFIED MELAMINE-CONTAINING RESINS, AND USE IN BINDERS FOR CELLULOSIC-BASED COMPOSITES

(75) Inventors: Pablo G. Dopico, Conyers; Brian M. Peek, Cornelia; Benjamin D. Gapud, Lawrenceville; Kelly A. Shoemake, Conyers; James C. Phillips, Peachtree, all of GA (US)

(73) Assignee: Georgia-Pacific Resins, Inc., Atlanta, GA (US)

( * ) Notice: Subject to any disclaimer, the term of this patent is extended or adjusted under 35 U.S.C. 154(b) by 0 days.

(21) Appl. No.: 09/339,030

(22) Filed: Jun. 23, 1999

(51) Int. Cl.[7] ............................ C08G 8/28; C08L 61/06; C08L 61/26
(52) U.S. Cl. ...................... 525/498; 525/497; 525/484; 528/254; 528/256; 428/562; 428/565; 428/568; 428/528
(58) Field of Search ................................ 525/498, 484, 525/497; 528/254, 256; 428/565, 502, 508, 528, 505

(56) References Cited

U.S. PATENT DOCUMENTS

| | | |
|---|---|---|
| 1,678,024 A | 7/1928 | Terwilliger |
| 2,641,584 A | 6/1953 | Martone, Jr. |
| 2,931,738 A | 5/1960 | Stalego |
| 3,002,857 A | 10/1961 | Stalego |
| 3,253,948 A | 5/1966 | Tiede |
| 3,856,562 A | 12/1974 | White et al. |
| 3,945,962 A | 3/1976 | Clark |
| 4,285,848 A | 8/1981 | Hickson |
| 4,710,406 A | 12/1987 | Fugier et al. |
| 4,778,510 A | 10/1988 | Hawkins |
| 5,008,365 A | 4/1991 | Druet et al. |
| 5,032,431 A | 7/1991 | Conner et al. |
| 5,086,089 A | 2/1992 | Shu |
| 5,270,434 A | 12/1993 | Tetart et al. |
| 5,300,562 A | 4/1994 | Conventry et al. |
| 5,306,783 A | 4/1994 | Kirchgaessner et al. |
| 5,362,842 A | 11/1994 | Graves et al. |
| 5,473,012 A | 12/1995 | Conventry et al. |
| 5,478,656 A | 12/1995 | Flory et al. |
| 5,534,612 A | 7/1996 | Taylor et al. |
| 5,623,032 A | 4/1997 | Wu |
| 5,674,971 A | 10/1997 | Graves |
| 5,753,871 A | 5/1998 | Kahara et al. |

FOREIGN PATENT DOCUMENTS

| | | |
|---|---|---|
| CA | 912721 | 10/1972 |
| GB | 2137218 | 10/1984 |
| JP | 7-118355 | 5/1995 |
| JP | 8-109309 | 4/1996 |
| WO | 99 32534 | 7/1999 |

OTHER PUBLICATIONS

PCT/US00/16911 International Search Report dated Oct. 2, 2000.

*Primary Examiner*—Duc Truong
(74) *Attorney, Agent, or Firm*—Banner & Witcoff, Ltd.

(57) ABSTRACT

A melamine-containing resin modified with a cyclic urea prepolymer comprising urea, formaldehyde and ammonia or a primary amine. The prepolymer-modified melamine-containing resin provides useful binders alone, or when combined or coreacted with other resins. Products prepared with the binder include wood composites such as particleboard and medium density fiberboard.

19 Claims, 3 Drawing Sheets

CYCLIC UREA-FORMALDEHYDE PREPOLYMER-MODIFIED MELAMINE-CONTAINING RESINS, AND USE IN BINDERS FOR CELLULOSIC-BASED COMPOSITES

BACKGROUND OF THE INVENTION

1. Field of the Invention

This invention relates to the preparation of cyclic urea prepolymer-modified melamine-containing resins, to their use in binders and to cellulosic-based composite products prepared using the binders. More particularly, the invention relates to a melamine-containing resin modified a with cyclic urea prepolymer comprising urea, formaldehyde, and ammonia or a primary amine which provides useful binders alone or with other resins such as urea-formaldehyde and phenol-formaldehyde based resins. Products prepared with the binders include wood composites such as particleboard and medium density fiberboard.

2. Description of Related Art

Urea-formaldehyde resins are used in the preparation of wood composites such as particleboard and medium density fiberboard because of their processing advantages and low cost relative to other typical wood adhesives. Urea-formaldehyde resins are typically prepared by reacting urea and formaldehyde to form various methylolated ureas and their condensation products in ratios that depend on the temperature, pH and time for the reaction.

The use of urea-formaldehyde resins is limited to applications where exterior durability is not required. Melamine has been included in urea-formaldehyde binders to improve the moisture resistance and thickness swelling performance of composites made with these binders. The melamine can be incorporated into wood composites in the form of a melamine-urea-formaldehyde resin, a melamine-formaldehyde resin, or as a blend of a urea-formaldehyde resin and melamine-formaldehyde resin. (U.S. Pat. Nos. 3,827,995 and 3,979,492) However, the addition of melamine adds significant cost to the composite.

Further, when urea-formaldehyde resins are used as a binder component they release formaldehyde into the environment during cure. Formaldehyde also can be released subsequently from the cured resin, particularly when the cured resin is exposed to acidic environments. Such formaldehyde release is undesirable, particularly in enclosed environments. In such environments, formaldehyde is inhaled by workers and comes into contact with the eyes, the mouth, and other parts of the body. Formaldehyde is malodorous and is thought to contribute to human and animal illness.

Various techniques have been used to reduce formaldehyde emission from urea-formaldehyde resins. Use of formaldehyde scavengers and various methods for resin formulation, including addition of urea as a reactant late in the resin formation reaction, are techniques often used to reduce formaldehyde emission. However, use of formaldehyde scavengers often is undesirable, not only because of the additional cost, but also because it affects the characteristics, or properties, of the resin. For example, using ammonia as a formaldehyde scavenger often reduces the resistance of the cured resin to hydrolysis (degradation). Later addition of urea to reduce free formaldehyde concentration in the resin generally yields a resin that must be cured at a relatively low rate to avoid smoking. Resin stability also can be adversely affected by such treatments. Melamine has also been used to prepare resins which have low formaldehyde emissions (U.S. Pat. No. 5,681,917)

Therefore, a binder which provides the advantages of melamine, which include reduced thickness swell, increased moisture resistance, and minimum formaldehyde emissions, at a reduced cost is desired.

SUMMARY OF THE INVENTION

The present invention is directed to melamine-containing wood binders that have been modified by replacing part of the melamine with a cyclic urea-formaldehyde prepolymer.

In accordance with the present invention, the cyclic urea prepolymer modifies melamine-containing resins and may be a cold blended additive to other binders such as urea-formaldehyde resins, phenol-formaldehyde resins or melamine-containing resins, or may be a coreactant added during the preparation of the binder.

The present invention is directed to a binder comprising a cyclic urea prepolymer; melamine or a melamine-containing resin; and at least one resin selected from the group consisting of urea-formaldehyde (UF), phenol-formaldehyde (PF), phenol-urea-formaldehyde (PUF), melamine-formaldehyde (MF), phenol-melamine-formaldehyde (PUF), melamine-urea-formaldehyde (MUF), and phenol-melamine-urea-formaldehyde (PMUF); wherein the cyclic urea prepolymer has mole ratios of urea:formaldehyde:ammonia or a primary amine between about 0.1 to 1.0:0.1 to 3.0:0.1 to 1.0, and wherein the cyclic urea prepolymer, the melamine or the melamine-containing resin, and the at least one resin are blended, coreacted, or both.

The present invention is further directed to consolidated wood products prepared with a substrate and a binder as defined above. In particular, the present invention is directed to particle board and medium density fiberboard.

The present invention is also directed to a consolidated wood product comprising a substrate and a wood binder comprising a cyclic urea prepolymer and melamine or a melamine-containing resin; wherein the cyclic urea prepolymer has mole ratios of urea:formaldehyde:ammonia or a primary amine between about 0.1 to 1.0:0.1 to 3.0:0.1 to 1.0, and wherein the cyclic urea prepolymer and melamine or the melamine-containing resin are blended or coreacted to form a cyclic urea prepolymer modified melamine-containing resin

DETAILED DESCRIPTION OF THE INVENTION

Figure 1:
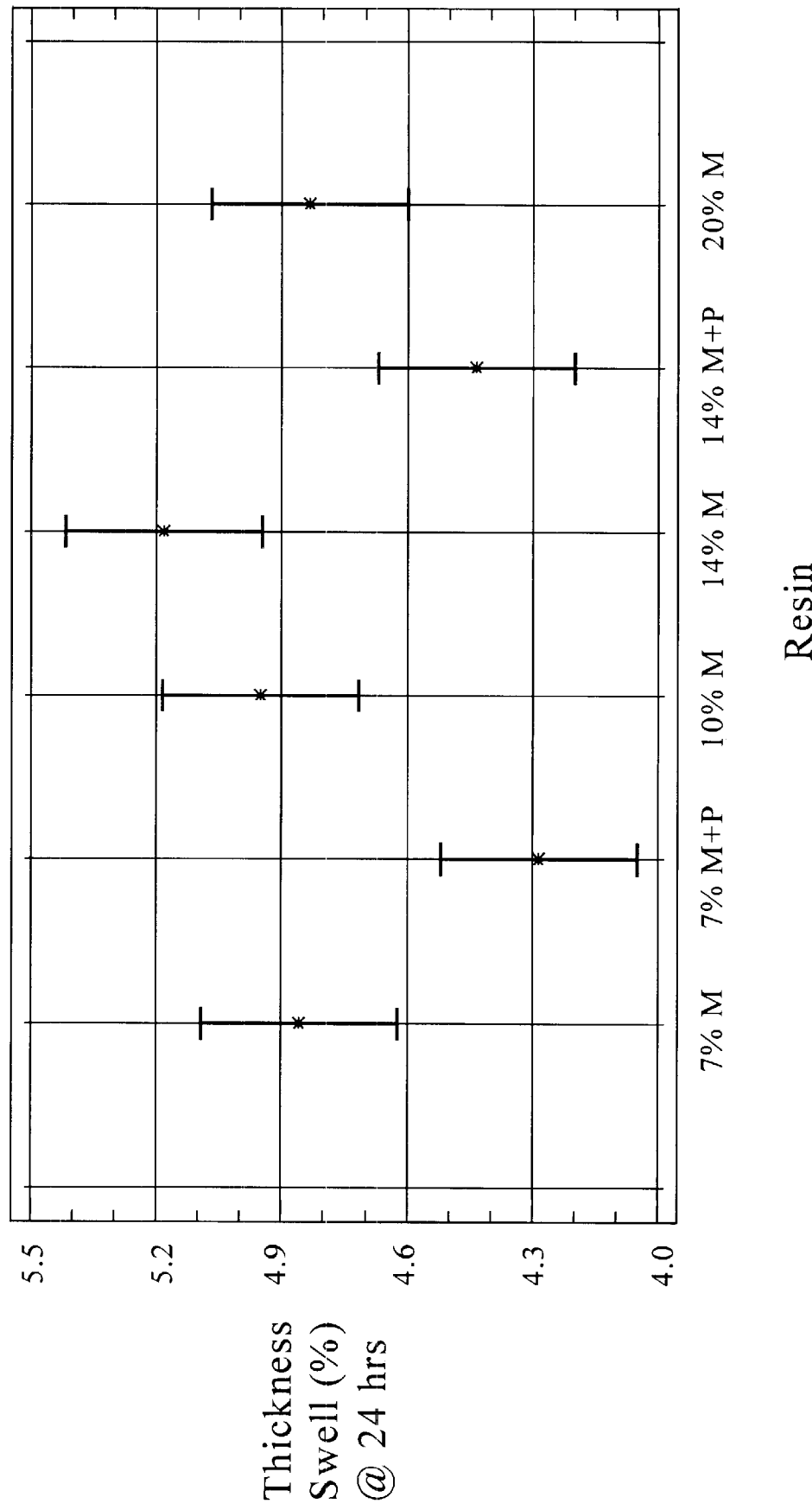
FIG. 1 depicts thickness swell (@ 24 hours) of particleboard with various levels of solids coming from melamine crystal.

The present invention is directed to melamine-containing wood binders that have been modified by replacing part of the melamine with a cyclic urea-formaldehyde prepolymer. The resulting binders provide resistance to swelling in particleboard and medium density fiberboard in moist environments.

The cyclic urea prepolymer (hereafter "prepolymer") modifies melamine-containing resins and may be a cold blended additive to other binders such as urea-formaldehyde resins, phenol-formaldehyde resins or melamine-containing resins, or may be a coreactant added during the preparation of the binder. Thus, the present invention is directed to several embodiments including:

1) A one-component prepolymer-modified melamine-formaldehyde (MF) resin where the prepolymer is blended or coreacted in situ with melamine and formaldehyde.
2) A two-component blend of urea-formaldehyde (UF) and prepolymer-modified MF resins.
3) A one-component prepolymer-modified melamine-urea-formaldehyde (MUF) resin where the prepolymer is reacted in situ with melamine, urea, and formaldehyde (or urea formaldehyde concentrate, UFC).
4) A two-component blend of phenol-formaldehyde (PF) and prepolymer-modified MF resins.
5) A one-component system prepolymer-modified phenol-melamine-formaldehyde (PMF) resin where the prepolymer is reacted in situ with phenol, melamine and formaldehyde.
6) A three-component blend of PF, UF, and prepolymer-modified MF resins.
7) A two-component blend of PF and prepolymer-modified MUF resins.
8) A one-component prepolymer-modified phenol-melamine-urea-formaldehyde (PMUF) resin.
9) A three-component blend of PF, UF, and prepolymer-modified MUF resins.

Preparation of the Cyclic Urea Prepolymer

All of the embodiments of the present invention require a cyclic urea prepolymer-modified melamine-containing resin. The cyclic urea prepolymer may be prepared by any suitable method. For example, urea, formaldehyde, and ammonia or primary amine are mixed and heated to the desired temperature for a set period of time to form a cyclic urea prepolymer. Preferably the mole ratio of reactants for the cyclic urea prepolymer are as follows:

| Formaldehyde: | About 0.1 to 3.0 |
| Ammonia or Primary Amine: | About 0.1 to 1.0 |
| Urea: | About 0.1 to 1.0 |

Any combination of the above mole ratios is contemplated; however, preferably the mole ratio of urea:formaldehyde:ammonia or primary amine is about 2.0:2.0:1.0 to 1.0:4.0:1.0 and more preferably about 2.0:4.0:1.0. It is contemplated that "ammonia or primary amine" also encompasses the use of both ammonia and a primary amine or more than one primary amine.

Processes of making cyclic urea prepolymers are recognized in the art. In a preferred embodiment, the cyclic urea prepolymer may be prepared by charging a reaction vessel with formaldehyde, ammonia, and urea while maintaining the temperature below about 70° C., preferably about 60° C. The order of addition is not critical, but it is important to take care during the addition of ammonia to formaldehyde (or formaldehyde to ammonia), due to the exothermic reaction. In fact, due to the strong exotherm, it may be preferred to charge the formaldehyde and the urea first, followed by the ammonia. This sequence of addition allows one to take advantage of the endotherm caused by the addition of urea to water to increase the rate of ammonia addition. Optionally a base may be added to maintain an alkaline condition throughout the cook.

Once all the reactants are in the reaction vessel, the resulting solution is heated to between about 85 to about 95° C., preferably about 90° C., for 30 to 90 minutes, usually about 1 hour or until the reaction is complete. Once the reaction is complete, the solution is cooled to room temperature for storage. The resulting solution is storage stable for several months at ambient conditions.

The yield is usually about 100%. The ratio of cyclic ureas to di- and tri-substituted ureas and mono-substituted ureas varies with the mole ratio of the reactants. For example, in a cyclic urea prepolymer having the mole ratio of 2.0:4.0:1.0 U:F:A, the urea was in the following proportions as characterized by $^{13}$C NMR: 42.1% cyclic ureas, 28.5% di/tri-substituted ureas, 24.5% mono-substituted ureas, and 4.9% free urea. A cyclic urea prepolymer having the mole ratio of 1.0: 1.2:0.5 U:F:A resulted in a solution characterized by $^{13}$C NMR where the urea had the following forms: 25.7% cyclic ureas, 7.2% di/tri-substituted ureas, 31.9% mono-substituted ureas, and 35.2 free urea.

In addition, the cyclic urea prepolymer may be prepared by a method such as disclosed in U.S. Pat. No. 5,674,971, which is hereby incorporated by reference in its entirety. The cyclic urea prepolymer is prepared by reacting urea and formaldehyde in at least a two-step and optionally a three-step process. In the first step, conducted under alkaline reaction conditions, urea and formaldehyde are reacted in the presence of ammonia, at an F/U mole ratio of between about 1.2:1 and 1.8:1. The ammonia is supplied in an amount sufficient to yield an ammonia/urea mole ratio of between about 0.05:1 and 1.2:1. The mixture is reacted to form a cyclic triazone/triazine or cyclic urea prepolymer which forms the building block for the ultimate resin.

Water soluble triazone compounds may also be prepared by reacting urea, formaldehyde and a primary amine as described in U.S. Pat. Nos. 2,641,584 and 4,778,510, each of which is incorporated by reference in its entirety. These patents also describe suitable primary amines such as, but not limited to, alkyl amines such as methyl amine, ethyl amine, and propyl amine, lower hydroxyamines such as ethanolamine cycloalkylmonoamines such as cyclopentylamine, and linear polyamines. The primary amine may be substituted or unsubstituted.

1) A one-component prepolymer-modified melamine-formaldehyde (MF) resin where the prepolymer is reacted in situ with melamine and formaldehyde A melamine-formaldehyde resin is prepared as known in the art with the exception that part of the melamine crystal is replaced with the cyclic urea prepolymer. Alternatively, a prepolymer modified MF resin may be prepared by reacting melamine with the cyclic urea prepolymer whereby the melamine reacts with excess formaldehyde at either acidic or basic pH's.

The melamine-formaldehyde resin is generally produced with a formaldehyde to melamine molar ratio in the range of about 0.5:1 to about 6:1, preferably in the range of about 1.5:1 to about 4.0:1. For example, melamine is reacted with formaldehyde under alkaline conditions in the presence of an effective amount of a catalyst and cyclic urea prepolymer. The resin and cyclic urea prepolymer are combined such that melamine crystal represents about 1% to about 90% of the prepolymer modified melamine-formaldehyde resin solids, preferably about 45% of the resin solids, and the urea-formaldehyde prepolymer represents about 1% to about 60% of the prepolymer modified melamine-formaldehyde resin solids As used herein, the phrase "under alkaline conditions" with reference to the reaction mixture means a pH of between about 7 and about 11, preferably between about 8.5 and about 10.5 and, more preferably, between about 9.0 and about 9.5. The alkaline condition for synthesizing the modified melamine-formaldehyde resin may be achieved simply by adding a base to an aqueous mixture to obtain the desired pH. Suitable bases include, but are not limited to, alkali metal hydroxides, such as sodium, lithium, or potassium hydroxide. Other bases include alkali metal carbonates, such as sodium carbonate and potassium carbonate, alkaline earth hydroxides, such as magnesium hydroxide, calcium hydroxide and barium hydroxide, aqueous ammonia, and amines, such as triethanolamine. Preferably caustic soda (sodium hydroxide) is used.

Although melamine is specifically mentioned for use in the practice of this invention, and is generally preferred, the melamine may be partially or totally replaced with other suitable amine-containing compounds. Other suitable compounds include urea, thiourea, dicyandiamide, melem, melam, melon, ammeline, ammelide, substituted melamines, guanamines, or mixtures thereof Substituted melamines include the alkyl melamines and aryl melamines, which can be mono-, di-, or tri-substituted. In the alkyl-substituted melamines, each alkyl group can contain from 1 to 6 carbons, preferably from 1 to 4 carbons. Representative examples of some alkyl-substituted melamines are monomethylmelamine, dimethyl melamine, trimethyl melamine, monoethyl melamine, and 1-methyl-3-propyl-5-butyl melamine. In the aryl-substituted melamines, each aryl group can contain 1–2 phenyl moieties and, preferably, 1 phenyl moiety. Typical examples of an aryl substituted melamine are monophenyl melamine or diphenyl melamine. Based on considerations of cost and availability, standard melamine is generally preferred.

The prepolymer-modified melamine-formaldehyde resin may be used without any other resins as a binder for wood composites. An advantage of the prepolymer-modified MF versus a standard MF is the lower cost of the binder system while maintaining comparable moisture resistance and emissions characteristics. Another advantage is a 10-fold increase in storage stability of prepolymer-modified MF resins over unmodified MF resins.

2) A two-component blend of urea-formaldehyde (UF) and prepolymer-modified MF resins A two-component binder is prepared by combining a urea-formaldehyde resin and a prepolymer-modified melamine-formaldehyde resin in any desirable proportion. Preferably, melamine crystal represents about 1% to about 90% of the prepolymer modified melamine-formaldehyde resin solids; and the cyclic urea prepolymer represents about 1% to about 60% of the prepolymer modified melamine-formaldehyde resin solids. The preferred UF:modifiedMF resin solids ratio is from about 99:1 to about 1:99. A more preferred UF:modifiedMF resin solids ratio is from about 50:50 to about 95:5, and most preferably about 60:40 to about 90:10.

The preparation of urea-formaldehyde resins is well known in the art and the present invention is not limited to any particular process. Typically, urea-formaldehyde resins are prepared by reacting urea and formaldehyde under acidic or alkaline conditions to achieve methylolation of the urea followed by condensation under acidic conditions to build higher molecular weight fragments.

The reaction of urea and formaldehyde under basic conditions is performed in molar ratios of formaldehyde to urea of about 3.4:1.0 to about 4.4:1.0, preferably about 3.5:1.0 to about 4.0:1.0. The acidic conditions refer to a pH in the range of about 3.5 to about 5.5, preferably about 5 to about 5.5. The acidic conditions are achieved by addition of various dilute acids or acid salts, including but not limited to formic acid, ammonium sulfate, and ammonium chloride.

Both acidic and basic methylolations are typically performed at aqueous reflux near 100° C. Following either type of methylolation, urea is added to achieve in a molar ratio of about 1.6:1.0 to about 2.2:1.0, and the reaction mixture is adjusted to an acidic pH for condensation. The rate of condensation and viscosity increase is proportional to the acidity of the solution. The condensation is performed at a pH of about 4.5 to about 6, preferably about 5 to about 5.5.

Following condensation, water may be distilled from the resin to achieve a desired viscosity or resin solids content. Furthermore, the amount of distillation may be reduced by the use of various urea-formaldehyde concentrates in place of the 50% formaldehyde solution that is typical of the industry.

The condensation is generally followed by various hot or cold additions of raw materials such as urea, salts, catalysts and various acids or bases to achieve a finished molar ratio of formaldehyde to urea of about 1.0:1.0 to about 1.8:1.0, preferably about 1.1:1.0 to about 1.5:1.0, and a finished pH of about 7.0 to about 8.5, preferably about 7.2 to about 7.8.

Composite wood panels made with a combination of a urea-formaldehyde resin and a melamine-based resin having a partial replacement of melamine with cyclic urea-formaldehyde prepolymer show comparable thickness swells to the boards made with higher melamine levels with no prepolymer and show a smaller (i.e., better) thickness swell than boards made with control binders that have the same amount of melamine but no prepolymer. In addition, such boards show similar or improved internal bond strengths (IB) versus both the boards with the higher melamine content and the control boards with the same melamine content as the prepolymer boards. Furthermore, prepolymer-modified composite wood panels also showed decreased thickness swells after a 2 hour boiling test.

3) A one-component prepolymer-modified melamine-urea-formaldehyde (MUF) resin where the prepolymer is reacted in situ with melamine, urea, and formaldehyde A one-component prepolymer-modified melamine-urea-formaldehyde resin is prepared by reacting the prepolymer with melamine, urea, and formaldehyde (or urea formaldehyde concentrate, UFC) to make a prepolymer-modified MUF resin in situ. Preferably, the melamine crystal represents about 1% to about 90% of the prepolymer modified melamine-urea-formaldehyde resin solids, and the cyclic urea prepolymer represents about 1% to about 60% of the prepolymer modified melamine-urea-formaldehyde resin solids.

For example, between about 0.1 to about 30 parts, preferably about 0.1 to about 20 parts, of a 45% solids cyclic urea-formaldehyde prepolymer are mixed with about 30 to about 60 parts, preferably about 45 parts, of 50% formaldehyde, 0 to about 30 parts, preferably about 10 to about 15 parts of an 85% solids urea-formaldehyde concentrate, 0 to about 20 parts, preferably about 9 parts, of urea, 0 to about 40 parts, preferably about 1 to about 30 parts of solid melamine, and various pH modifiers. This mixture is heated at reflux for a period of time between about 5 minutes and about 120 minutes, preferably about 20 to about 40 parts. The mixture is then treated with about 5 to about 20 minutes, preferably about 7 to about 15 parts, of urea and a small quantity of ammonia and condensed until a specific viscosity is achieved. The mixture may then be optionally treated with an additional about 5 to about 30 parts, preferably about 10 to about 20 parts, of urea to yield a prepolymer-modified MUF resin.

4) A two-component blend of phenol-formaldehyde (PF) and prepolymer-modified MF resins A two-component binder of phenol-formaldehyde (PF) resins with prepolymer-modified MF resins may be prepared by combining a phenol-formaldehyde resin and a prepolymer-modified melamine-formaldehyde resin in any suitable ratio. Preferably, melamine crystal represents about 1% to about 90% of the prepolymer modified melamine-formaldehyde resin solids, and the cyclic urea prepolymer represents about 1% to about 60% of the prepolymer modified melamine-formaldehyde resin solids. Typical PF:modifiedMF ratios range from about 1:99 to about 99:1., preferably from about 10:90 to about 80:20 and most preferably from about 20:80 to about 50:50.

The phenol-formaldehyde resin may be prepared by any suitable method to provide a binder resin typically having a final pH between about 9 and about 12 and a sufficiently high formaldehyde mole ratio to make the resin thermosetting. For example, a phenolic resole resin is prepared to provide a formaldehyde to phenol mole ratio of about 1:1 to 3:1, preferably about 1.8:1 to 2.7:1. The present invention is not limited to any particular process of preparing the resin and methods are well known to those skilled in the art.

5) A one-component prepolymer-modified phenol-melamine-formaldehyde (PMF) resin where the prepolymer is reacted in situ with phenol, melamine and formaldehyde A one component binder incorporating prepolymer as a partial replacement for melamine may be prepared by following any procedure known to those skilled in the art for synthesis of PMF resins and replacing a portion of the melamine charge with the prepolymer.

For example, melamine (9 parts), prepolymer (8 parts of a 45% solids solution), phenol (10 parts) and formaldehyde (28 parts of 50% formaldehyde) are mixed with a suitable base such as sodium hydroxide and reacted at 90° C. for 30 minutes and then at reflux (95–98° C.) for 2 hours to form a PMF resin which cures thermally to form a transparent binder.

Alternatively, melamine (9 parts), prepolymer (6 parts of a 45% solids solution), and formaldehyde (12 parts of 50% formaldehyde) may be reacted together for 50–60 minutes at 95° C. Phenol (9 parts), formaldehyde (9 parts), and a suitable base catalyst such as magnesium carbonate are then added and the mixture is heated at 95° C. until a resin of the desired viscosity or water tolerance is obtained.

While both of the above examples are done at basic pHs, it is also known to those skilled in the art that the reaction may also be performed at acidic pHs employing catalysts such as oxalic acid. Such procedures may also be employed to prepare prepolymer modified PMF resins.

6) A three-component blend of PF, UF, and prepolymer-modified MF resins

A three component binder made with the PF, UF and prepolymer-modified MF resins may be prepared with any combination of the three binders. The PF:UF:modifiedMF resin solids ratio is preferably about 0.1–10:0.1–0:0.1–10. Preferably the melamine crystal represents about 1% to about 90% of the prepolymer modified melamine-formaldehyde resin solids, and the cyclic urea prepolymer represents about 1% to about 60% of the prepolymer modified melamine-formaldehyde prepolymer resin solids.

7) A two-component blend of PF and prepolymer-modified MUF resins

A two-component PMUF binder may be prepared by blending a PF resin with a prepolymer-modified MUF resin in any suitable ratio. Typical PF to MUF ratios for such blends would be from about 50:50 to about 1:99. The preferred ratios are from about 40:60 to about 10:90, and the most preferred ratios are from 35:65 to 25:75.

8) A one-component prepolymer-modified phenol-melamine-urea-formaldehyde (PMUF) resin A one-component binder incorporating cyclic urea-formaldehyde prepolymer as a partial melamine replacement may be prepared including phenol, melamine, urea and formaldehyde in the formulation as known to those skilled in the art. A typical example of preparing a phenol-melamine-urea-formaldehyde resin is found in British Patent 2,027,439. Typically about 5 to about 20 parts of phenol, preferably about 10 to about 15, are mixed with about 40 to about 60 parts of a 50% solution of formaldehyde, preferably about 45 to about 55. Melamine, about 10 to about 25 parts, preferably about 15 to about 20, is then added to this mixture and heated until a desired level of clarity or water dilutability is attained. Urea, about 5 to about 20 parts, preferably about 10 to about 15, is then added and reacted at elevated temperatures until another cut-off is reached, such as a target viscosity or water tolerance. Final additions of urea or urea-formaldehyde concentrates are also typical, 0 to about 20 parts, preferably about 10 about 15.

In the binders of the invention, part of the melamine is replaced with the prepolymer. For example, 10 parts of phenol are mixed with 53 parts of 50% formaldehyde, and to this mixture are added 13 parts of melamine and 6 parts of prepolymer. The mixture is adjusted to a pH of 9.0–9.5 with any suitable base, such as sodium hydroxide, and heated to 95° C. until the solution becomes clear. Urea (12 parts) is then added and reacted at 85–90° C. until a water tolerance of 150% is reached. The reaction is then cooled to 50° C. and a final charge of 4 parts of urea is added.

9) A three-component blend of PF, UF, and prepolymer-modified MUF resins

A three-component binder made with the PF, UF and prepolymer-modified MUF resins may be prepared with any combination of the three binders. Typical ratios of PF/UF/MUF are 20–30 parts of PF to 30–40 parts of UF to 35–45 parts of MUF, and a specific suitable ratio is 25:35:40.

Properties and Characteristics of the Binders

The binders of the present invention are typically clear liquids at room temperature, although some will be white, particularly at higher degrees of advancement, and some may have a reddish color, particularly those containing phenol. For specific applications the products of the invention may be spray dried to a solid form.

The liquid version of the binders will typically have a Brookfield viscosity in the range of 75–150 cps at 60% solids, but binders of both higher and lower viscosities may be prepared with careful control of the time and temperature of the reaction and should be considered equivalent as long as they can be applied to a wood substrate in the manufacture of wood composites.

The free formaldehyde of the resins will typically be below 1%, preferably below 0.5%, and most preferably below 0.1%. Higher free formaldehyde versions of the products of this invention are typically less desirable because of the increased formaldehyde emissions but are still within the scope of present invention.

An advantage of the prepolymer-modified binder described herein versus binders with no cyclic urea-formaldehyde prepolymer is the reduced cost of the binder when part of the melamine in a typical formulation is replaced with the lower cost prepolymer regardless of whether the binder is prepared as a one-, two- or three-component binder.

An advantage of the one-component binder versus two- or three-component binders is the ease of handling at the mill sites, since on-site mixing is not required and separate inventories of multiple resins are not necessary.

An advantage of the two-component binders over one-component binders is the flexibility at the mills to combine the two components in different ratios depending on the desired balance between properties such as level of moisture resistance and binder cost.

An advantage of the three-component binder versus the related two- and one-component binders is the flexibility at the mill to blend different ratios of the components to achieve different properties, such as increased hydrophobicity by increasing the amounts of the PF or MF portions, or decreased cost or glue line coloration by increasing the amounts of the UF. A 10-fold improvement in storage stability (U.S. patent appl. Ser. No. 09/215,742) of the prepolymer modified MF resins versus unmodified MF resins makes this multi-component approach practical, while unmodified MF resins, which typically have very poor storage stabilities, limit the use of the multi-component approach at mill sites.

An advantage of binders containing phenol over binders containing only melamine, urea, and formaldehyde is increased durability in exterior or moist interior applications. This increase in durability is typically inferred from reduced thickness swelling and water absorption, as well as improved retention of internal bond strength after boiling tests such as the European EN 1087–1 test or the Japanese Industrial Standard JIS-100.

An advantage of binders that contain no phenol is that they may cure more rapidly. Further, they may also afford a lighter glue-line, which is advantageous for applications where the glue-line is visible.

Reactants

Skilled practitioners recognize that the reactants are commercially available in many forms. Any form which can react with the other reactants and which does not introduce extraneous moieties deleterious to the desired reactions and reaction products can be used in the preparation of the resins of the invention.

Formaldehyde is available in many forms. Paraform (solid, polymerized formaldehyde) and formalin solutions (aqueous solutions of formaldehyde, sometimes with methanol, in 37 percent, 44 percent, or 50 percent formaldehyde concentrations) are commonly used forms. Formaldehyde also is available as a gas. Any of these forms is suitable for use in the practice of the invention. Typically, formalin solutions are preferred as the formaldehyde source.

Similarly, urea is available in many forms. Solid urea, such as prill, and urea solutions, typically aqueous solutions, are commonly available. Further, urea may be combined with another moiety, most typically formaldehyde and urea-formaldehyde, often in aqueous solution. Any form of urea or urea in combination with formaldehyde is suitable for use in the practice of the invention. Both urea prill and combined urea-formaldehyde products are preferred, such as Urea Formaldehyde Concentrate or UFC 85. These types of products are disclosed in, for example, U.S. Pat. Nos. 5,362,842 and 5,389,716.

Ammonia is available in various gaseous and liquid forms, particularly including aqueous solutions at various concentrations. Any of these forms is suitable for use. However, commercially-available aqueous ammonia-containing solutions are preferred herein. Such solutions typically contain between about 10 and 35% ammonia. A solution having 35% ammonia can be used providing stability and control problems can be overcome. An aqueous solution containing about 28% ammonia is particularly preferred. Anhydrous ammonia may also be used.

Phenol may be any phenol typically used in preparing phenolic resole resins. Typically, ordinary phenol is used, but the phenol may be partly or completely substituted with xylenols, cresols, catechol, resorcinol, alkyl resorcinols, other naturally occurring or synthetic phenols or alkyl phenols such as cresylic acids, urea, melamine, or combinations thereof Suitable basic catalysts used to prepare the resins include, but are not limited to, alkali metal hydroxides, alkaline earth hydroxides, ammonium hydroxide, metal carbonates, and amines. Suitable acidic catalysts used to prepare the resins are various dilute acids or acid salts including but not limited to, ammonium sulfate, ammonium chloride, and formic acid.

The reactants may also include a small amount of a resin modifier such as ethylenediamine (EDA). Additional modifiers, such as melamine, sucrose or other sugars, ethylene ureas, and primary, secondary and triamines, for example, dicyanodiamide can also be incorporated into the resins of the invention. Concentrations of these modifiers in the reaction mixture may vary from 0.05 to 10.00%. These types of modifiers promote hydrolysis resistance, polymer flexibility and lower formaldehyde emissions.

To achieve the desired result as disclosed herein, the ingredients can be blended or reacted in any desirable and effective order. For example, the cyclic urea prepolymer may be added to the binder composition as a separate material but may also be added as urea, formaldehyde, and ammonia in any order of addition that achieves the desired cyclic urea prepolymer product. Melamine and other ingredients may also be blended or coreacted in any order to achieve the desired end product.

For instance, in a preferred embodiment, melamine is combined with the cyclic urea prepolymer and formaldehyde to produce a modified melamine resin and then a urea-formaldehyde resin is combined or coreacted with the modified melamine resin to achieve the desired modified melamine-urea-formaldehyde resin. Alternatively, the cyclic urea prepolymer may be combined or coreacted with a urea-formaldehyde resin and then combined or coreacted with a melamine-containing resin to achieve the desired prepolymer modified melamine-urea-formaldehyde resin.

Applications of the Cyclic Urea Prepolymer-Modified Resins

Binders are prepared using the cyclic urea prepolymer-modified melamine-containing resins. The binders of the present invention may be used to prepare particleboard, MDF or other wood composites. The binders may include, as desired, catalysts, additional water to achieve a desired solids level, waxes or other hydrophobic additives, or any of the additives that are known to those skilled in the art of manufacturing wood composites. For plywood applications, typical additives will include fillers such as ground pecan or walnut shells and extenders such as wheat flour that improve the ability of the binder to remain at the glue line and decrease the total cost of the binder package.

Wood composites such as particleboard and medium density fiberboard are made by curing wood particles or fibers in a hot press in the presence of a thermosetting binder. The wood raw material is reduced to the appropriate size by various processes such as hogging, grinding, hammer milling and flaking. The wood or fiber substrate is then dried to a uniform moisture content and screened to achieve a desired particle size distribution. The wood or fiber is then blended with the resin binder, formed into a mat, and consolidated in a hot press to a desired density and thickness (flat-press process). Alternatively, the blended furnish may be continually extruded through a hot die (extrusion process). Finishing processes include trimming and sanding, and in some instances cutting to size, routing, etc.

EXAMPLES

Example 1

Preparation of Cyclic Urea Prepolymer a) A cyclic urea prepolymer having a mole ratio of 2.0:4.0:1.0, urea:formaldehyde:ammonia (U:F:A), was prepared by charging a reaction vessel with formaldehyde, ammonia, and urea while maintaining the temperature below about 65° C. Once all the reactants were in the reaction vessel, the resulting solution was heated to about 90° C., and was maintained at 90° C. for about 1 hour until the reaction was complete. Once the reaction was complete, the solution was cooled to room temperature. $^{13}$C NMR indicated that the urea was in the following forms: 42.1% cyclic ureas, 28.5% di/tri-substituted ureas, 24.5% mono-substituted ureas, and 4.9% free urea.

b) A second cyclic urea prepolymer was prepared in the same manner as a) except for the mole ratio of 1.0:1.2:0.5. $^{13}$C NMR indicated that the urea was in the following forms: 25.7% cyclic ureas, 7.2% di/tri-substituted ureas, 31.9% mono-substituted ureas, and 35.2% free urea.

Example 2

Cyclic urea-formaldehyde prepolymer made in accordance with Example 1a was mixed with water, formaldehyde, sucrose and melamine and heated to make a cyclic urea-formaldehyde prepolymer-modified melamine resin. Separately, a standard urea-formaldehyde resin was made by methylolation and condensation of urea and formaldehyde. The prepolymer-modified melamine resin and the urea-formaldehyde resin were mixed in UF:modifiedMF resin solids ratios of 70:30 and 85:15. These resin mixes were adjusted to the same resin solids content with water additions and to the same pH with ammonium sulfate to form a binder that was sprayed on particleboard wood furnish in a rotary blender. The furnish had also been previously treated with a wax emulsion. The resinated furnish was then dispersed uniformly in a deckle box and pre-pressed to form a panel that was then pressed at a maximum pressure of 600 psi and a temperature of 330 F to make particleboard.

The particleboards were tested for the strength of their internal bond (IB) using an Instron and for resistance to moisture by measuring the thickness swell of the boards following ASTM 1037.

The particleboards made from a binder comprising a mixture of UF and cyclic urea prepolymer-modified MN resin were compared to two controls where the unmodified MF resin in the binder contained no prepolymer. The study is summarized in Table I. The first control (Control #1, Table I) was to add 30% of the binder solids in the form of MF resin, the MF with no prepolymer. In this control, 20% of the binder solids are from melamine crystal. The test condition (Test #1, Table I) was to add the same 30% of the total binder solids in the form of prepolymer-modified MF. The actual amount of binder solids from melamine crystal drops to only 14%, since the prepolymer-modified MF has less melamine. The second control (Control #2, Table I) used sufficient unmodified MF resin to provide 14% of the binder solids from melamine crystal. In this case, the required amount of unmodified MF resin was 21% of the total binder solids.

The study was also duplicated at half the unmodified MF resin level. In this case, 15% of the binder solids were applied as unmodified MF resin as the first control (Control #3, Table I,) corresponding to 10% of binder solids from melamine crystal. The test condition (Test #2, Table I) was to add 15% of the binder as prepolymer-modified MF resin, yielding 7% of the solids from melamine crystal. Again, the second control (Control #4, Table I) was to add the amount of unmodified ME resin solids that would be required to match the 7% solids from melamine crystal in the test condition. This corresponded to 10.4% of the solids in the form of unmodified MF resin.

TABLE I

Summary of conditions tested and controls

| Test # | MF Resin | % MF Resin Solids in Binder | % Solids from Melamine Crystal |
|---|---|---|---|
| Control 1 | no prepolymer | 30 | 20 |
| Test 1 | prepolymer | 30 | 14 |
| Control 2 | no prepolymer | 21 | 14 |
| Control 3 | no prepolymer | 15 | 10 |
| Test 2 | prepolymer | 15 | 7 |
| Control 4 | no prepolymer | 10 | 7 |

The use of binders with cyclic urea-formaldehyde prepolymer as a partial melamine replacement results in no increase in thickness swell compared to the control binders with the higher percentages of solids from melamine crystal and the same amount of melamine-formaldehyde resin solids, as shown in FIG. 1. Furthermore, the prepolymer-modified boards have lower thickness swells than the boards with the same amount of solids from melamine crystal but with no prepolymer modification. The prepolymer thus appears to act as an effective melamine extender, allowing a board with less melamine to perform as well as a board with a higher percentage of solids from melamine. This effect was observed at both levels of modification of UF resins with prepolymer-modified MF resins and is expected to carry over to any melamine-containing resin in addition to just blends of MF and UF resins.

Figure 2:
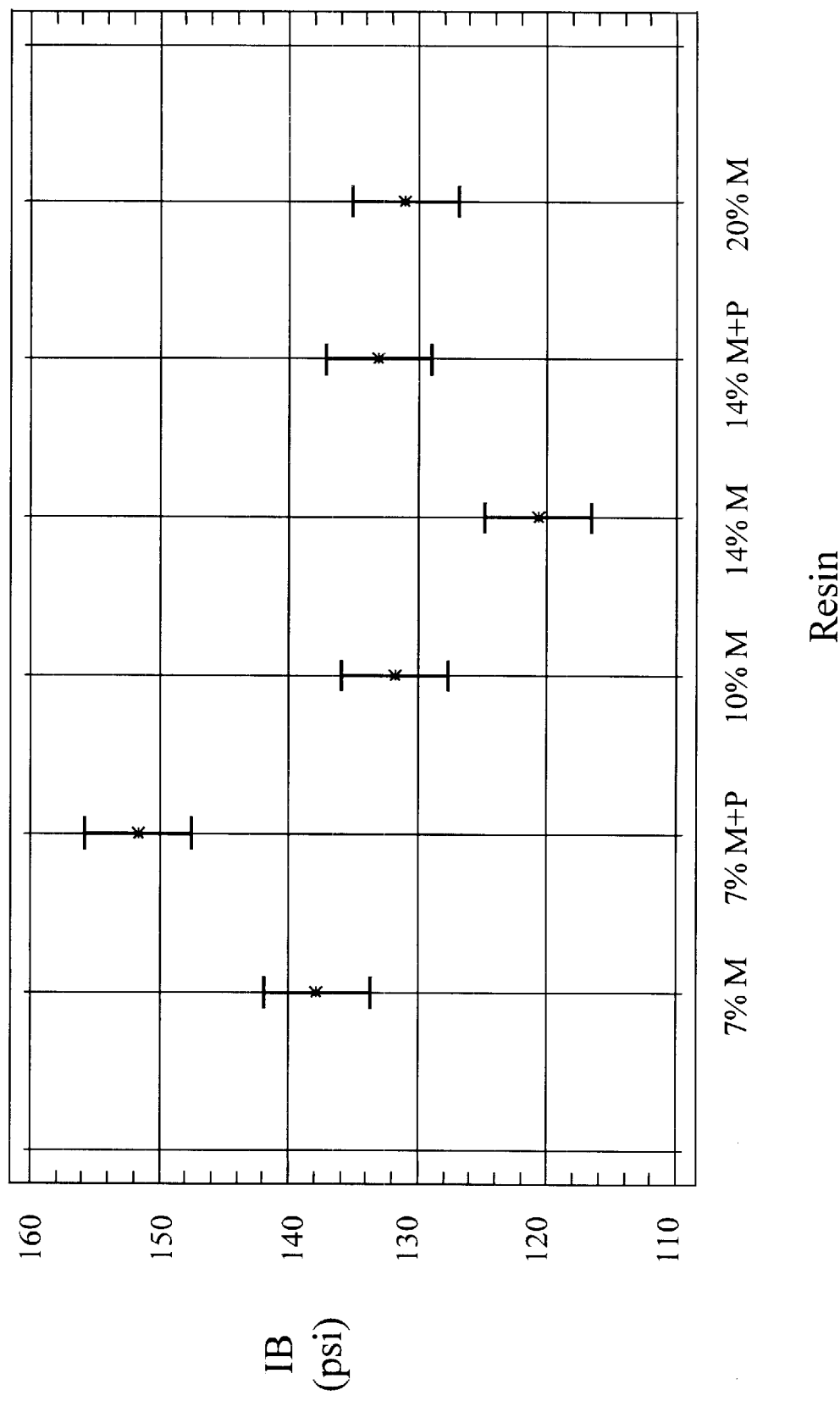
FIG. 2 depicts IB of particleboard with various levels of solids coming from melamine crystal.

In addition to the thickness swell improvements, the IB of particleboards made using prepolymer as a partial melamine replacement is comparable or improved for the prepolymer boards, as shown in FIG. 2.

Figure 3:
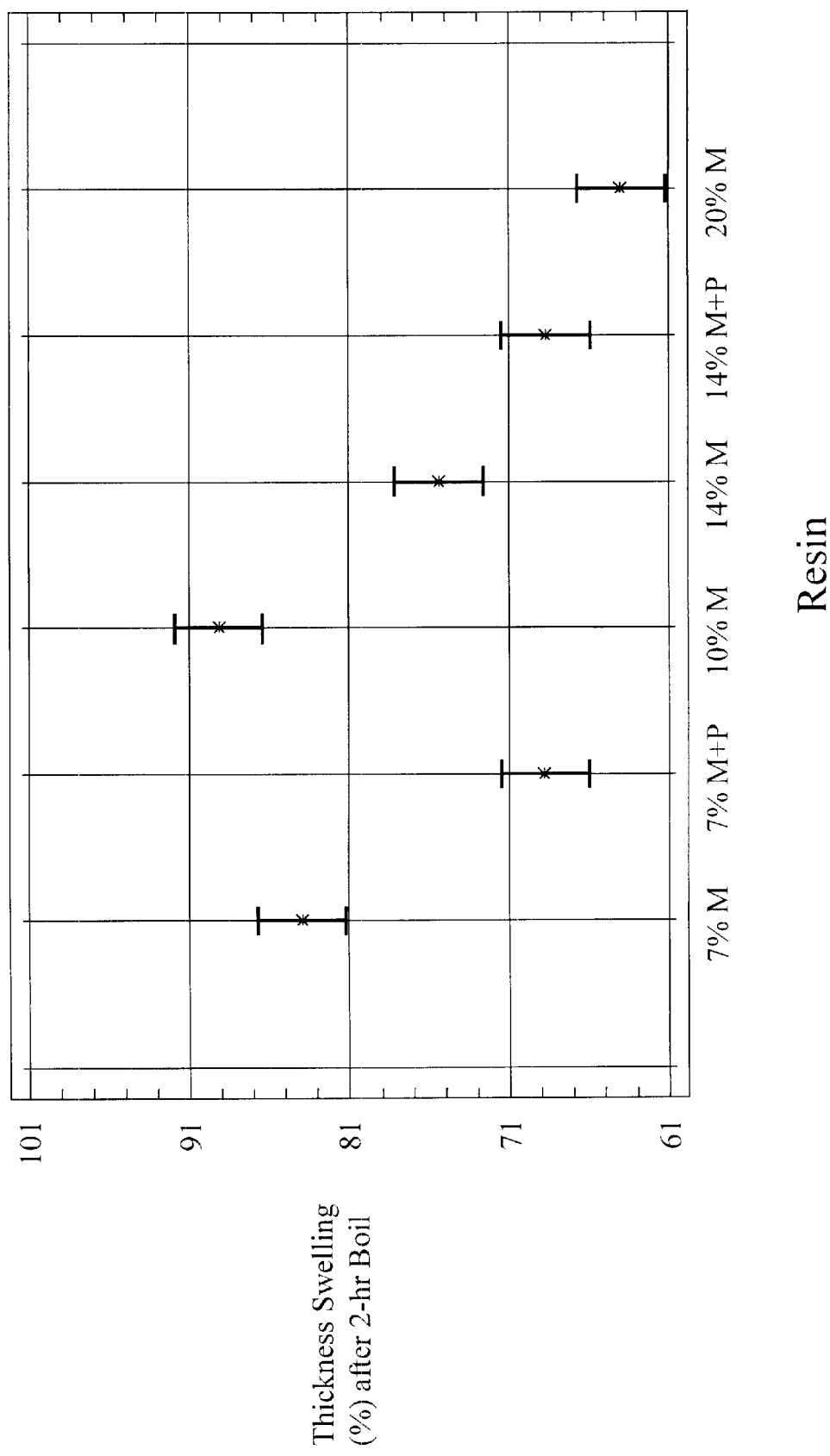
FIG. 3 depicts thickness swell (@ 2 hour boil) of particleboard with various levels of solids coming from melamine crystal.

Furthermore, the thickness swell after a 2 hour boiling test of particleboards made using prepolymer as a partial melamine replacement is comparable or improved for the prepolymer boards, as shown in FIG. 3.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A binder comprising a cyclic urea prepolymer; melamine or a melamine-containing resin; and at least one resin selected from the group consisting of urea-formaldehyde (UF), phenol-formaldehyde (PF), phenol-urea-formaldehyde (PUF), melamine-formaldehyde (MF), phenol-melamine-formaldehyde (PMF), melamine-urea-formaldehyde (MUF), and phenol-melamine-ureaformaldehyde (PMUF); wherein the cyclic urea prepolymer has mole ratios of urea:formaldehyde:ammonia or a primary amine between about 0.1 to 1.0:0.1 to 3.0:0.1 to 1.0, and wherein the cyclic urea prepolymer, the melamine or the melamine-containing resin, and the at least one resin are blended, coreacted, or both.

2. The binder of claim 1 wherein the at least one resin is a urea-formaldehyde resin; melamine crystal represents about 1% to about 90% of the prepolymer modified melamine-containing resin solids; and the cyclic urea prepolymer represents about 1% to about 60% of the prepolymer modified melamine-containing resin solids.

3. The binder of claim 2 wherein the UF:modified MF resin solids ratio is from about 99:1 to about 1:99.

4. The binder of claim 2 wherein the UF:modified MF resin solids ratio is from about 50:50 to about 95:5.

5. The binder of claim 2 wherein the UF:modified MF resin solids ratio is from about 60:40 to about 90:10.

6. The binder of claim 1 wherein the at least one resin is a phenol-formaldehyde resin; the PF:modified MF resin solids ratio is from about 1:99 to about 99:1, melamine crystal represents about 1% to about 90% of the prepolymer modified melamine-containing resin solids, and the cyclic urea prepolymer represents about 1 % to about 60% of the prepolymer modified melamine-formaldehyde resin solids.

7. The binder of claim 6 wherein the PF:modified MF resin solids ratio is from about 10:90 to about 80:20.

8. The binder of claim 6 wherein the PF:modified MF resin solids ratio is from about 20:80 to about 50:50.

9. The binder of claim 1 wherein the at least one resin is a combination of a phenol-formaldehyde resin and a urea-formaldehyde resin; the PF:UF:modified MF resin solids ratio is from about 0.1–10:0.1–10:0.1–10; melamine crystal represents about 1% to about 90% of the prepolymer modified melamine-containing resin solids, and the cyclic urea prepolymer represents about 1% to about 60% of the prepolymer modified melamine-formaldehyde prepolymer resin solids.

10. The binder of claim 1 wherein the at least one resin is a urea-formaldehyde resin and the cyclic urea prepolymer, melamine or melamine-containing resin, and urea-formaldehyde resin are reacted to form a cyclic urea prepolymer modified melamine-urea-formaldehyde resin (MUF); wherein melamine crystal represents about 1% to about 90% of the prepolymer modified melamine-urea-formaldehyde resin solids, and the cyclic urea prepolymer represents about 1% to about 60% of the prepolymer modified melamine-urea-formaldehyde resin solids; and the cyclic urea prepolymer has mole ratios of urea:formaldehyde: ammonia or a primary amine between about 0.1 to 1.0:0.1 to 3.0:0.1 to 1.0.

11. The binder of claim 10 further comprising a phenol-formaldehyde resin (PF) wherein the PF:modified MUF resin solids ratio is from about 100:1 to about 1:100.

12. The binder of claim 10 further comprising a phenol-formaldehyde resin (PF) and a urea-formaldehyde resin (UF) wherein the PF:UF:modified MUF resin solids ratio is about 1–100:1–100:1–100.

13. The binder of claim 10 further comprising a phenol-urea-formaldehyde resin (PUF) wherein the PUF:modified MUF resin solids ratio is from about 1:99 to about 99:1 melamine crystal represents about 1% to about 90% of the prepolymer modified melamine-urea-formaldehyde resin solids; and the cyclic urea prepolymer represents about 1% to about 60% of the prepolymer modified melamine-urea-formaldehyde resin solids.

14. The binder of claim 1 wherein the at least one resin is a phenol-formaldehyde resin and the cyclic urea prepolymer, melamine or melamine-containing resin, and phenol-formaldehyde resin are reacted to form a cyclic urea prepolymer modified phenol-melamine-formaldehyde resin (PMF); wherein melamine crystal represents about 1% to about 90% of the modified melamine-phenol-formaldehyde resin solids, and the cyclic urea prepolymer represents about 1% to about 60% of the prepolymer modified melamine-phenol-formaldehyde resin solids; and the cyclic urea prepolymer has mole ratios of urea:formaldehyde:ammonia or a primary amine between about 0.1 to 1.0:0.1 to 3.0:0.1 to 1.0.

15. The binder of claim 1 wherein the at least one resin is a phenol-urea-formaldehyde resin and the cyclic urea prepolymer, melamine or melamine-containing resin, and phenol-urea-formaldehyde resin are reacted to form a cyclic urea prepolymer modified phenol-melamine-urea-formaldehyde resin (PMUF) wherein the melamine crystal represents about 1% to about 90% of the prepolymer modified phenol-melamine-urea-formaldehyde resin solids; the cyclic urea prepolymer represents about 1% to about 60% of the prepolymer modified phenol-melamine-urea-formaldehyde resin solids; and the cyclic urea prepolymer has mole ratios of urea:formaldehyde:ammonia or a primary amine between about 0.1 to 1.0:0.1 to 3.0:0.1 to 1.0.

16. A consolidated wood product comprising a substrate and the binder of claim 1.

17. A consolidated wood product comprising a substrate and a wood binder comprising a cyclic urea prepolymer and melamine or a melamine-containing resin; wherein the cyclic urea prepolymer has mole ratios of urea:formaldehyde:ammonia or a primary amine between about 0.1 to 1.0:0.1 to 3.0:0.1 to 1.0, and wherein the cyclic urea prepolymer and melamine or the melamine-containing resin are blended or coreacted to form a cyclic urea prepolymer modified melamine-containing resin.

18. The consolidated wood product of claim 16 wherein the consolidated wood product is particleboard or medium density fiberboard.

19. The consolidated wood product of claim 17 wherein the consolidated wood product is particleboard or medium density fiberboard.

* * * * *